(12) United States Patent
Riss et al.

(10) Patent No.: US 11,565,473 B2
(45) Date of Patent: Jan. 31, 2023

(54) PROPAGATION OF A MATERIAL THROUGH AN INTERIOR VOLUME OF A THREE-DIMENSIONAL OBJECT

(71) Applicants: Instituto Atlântico, Fortaleza (BR); Hewlett-Packard Development Company, L.P., Spring, TX (US)

(72) Inventors: Marcelo Riss, Porto Alegre (BR); Jamie Machado Neto, Sant Cugat del Valles (ES); Victor Praxedes, Fortaleza (BR); Ana Patricia Del Angel, Guadalajara (MX); Adriana Fontenele, Fortaleza (BR); Thiago Moura, Fortaleza (BR); Jun Zeng, Palo Alto, CA (US); Scott White, Boise, ID (US); Sebastia Cortes i Herms, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 261 days.

(21) Appl. No.: 16/615,612

(22) PCT Filed: Jul. 26, 2017

(86) PCT No.: PCT/US2017/043884
§ 371 (c)(1),
(2) Date: Nov. 21, 2019

(87) PCT Pub. No.: WO2019/022730
PCT Pub. Date: Jan. 31, 2019

(65) Prior Publication Data
US 2020/0223145 A1 Jul. 16, 2020

(51) Int. Cl.
*B29C 64/393* (2017.01)
*B33Y 30/00* (2015.01)
*B33Y 50/02* (2015.01)

(52) U.S. Cl.
CPC ........... *B29C 64/393* (2017.08); *B33Y 30/00* (2014.12); *B33Y 50/02* (2014.12)

(58) Field of Classification Search
CPC ....... B29C 64/393; B33Y 30/00; B33Y 50/02; B33Y 50/00; B22F 7/02; B22F 10/30; B22F 10/80
See application file for complete search history.

(56) References Cited

U.S. PATENT DOCUMENTS

| | | |
|---|---|---|
| 6,658,314 B1 | 12/2003 | Gothait |
| 7,373,214 B2 | 5/2008 | Silverbrook |

(Continued)

OTHER PUBLICATIONS

Bickel, B. et al. "Design and fabrication of materials with desired deformation behavior." ACM Transactions on Graphics (TOG) 29, No. 4 (2010): 63.

(Continued)

*Primary Examiner* — Joseph S Del Sole
*Assistant Examiner* — John Robitaille
(74) *Attorney, Agent, or Firm* — Shook, Hardy & Bacon L.L.P.

(57) ABSTRACT

An image processing system acquires a first three-dimensional model of an object. The image processing system includes a processor and storage medium encoded with instructions executable by the processor. The instructions include instructions to define a material potential function for a material. The material potential function is a function of a three-dimensional origin point of the material in the object, a three-dimensional propagation limit of the material in the object, and a three-dimensional propagation function of the material in the object. The instructions include (Continued)

instructions to generate a second three-dimensional model of the object based in part on the material potential function and the first model. The second model illustrates propagation of the material through an interior volume of the object at a unit level. A controller generates control signals based on the second model, and a fluid ejection engine performs an additive manufacturing process based on the control signals.

20 Claims, 5 Drawing Sheets

(56) References Cited

U.S. PATENT DOCUMENTS

| | | |
|---|---|---|
| 8,126,580 B2 | 2/2012 | El-Siblani et al. |
| 2012/0065755 A1 | 3/2012 | Steingart et al. |
| 2015/0258770 A1 | 9/2015 | Chan et al. |
| 2016/0101570 A1 | 4/2016 | Lorio et al. |
| 2016/0167306 A1 | 6/2016 | Vidimce et al. |
| 2017/0052516 A1 | 2/2017 | Minardi et al. |

OTHER PUBLICATIONS

Doubrovski, E. L., et al. "Voxel-based fabrication through material property mapping: A design method for bitmap printing." Computer-Aided Design 60 (2015): 3-13.

Hiller, J et al., "Tunable digital material properties for 3D voxel printers." Rapid Prototyping Journal 16, No. 4 (2010): 241-247.

PROPAGATION OF A MATERIAL THROUGH AN INTERIOR VOLUME OF A THREE-DIMENSIONAL OBJECT

BACKGROUND

Additive manufacturing processes (also referred to as "three-dimensional printing" processes) are often used to fabricate objects including three-dimensional objects. Such three-dimensional objects may include functional and aesthetic machine components, consumer and industrial products, and customized high-value-products. In some cases, these three-dimensional objects may have heterogeneous compositions. That is, the interior volumes of the three-dimensional objects may be composed of two or more different materials in order to meet certain design objectives.

DETAILED DESCRIPTION

Figure 1:
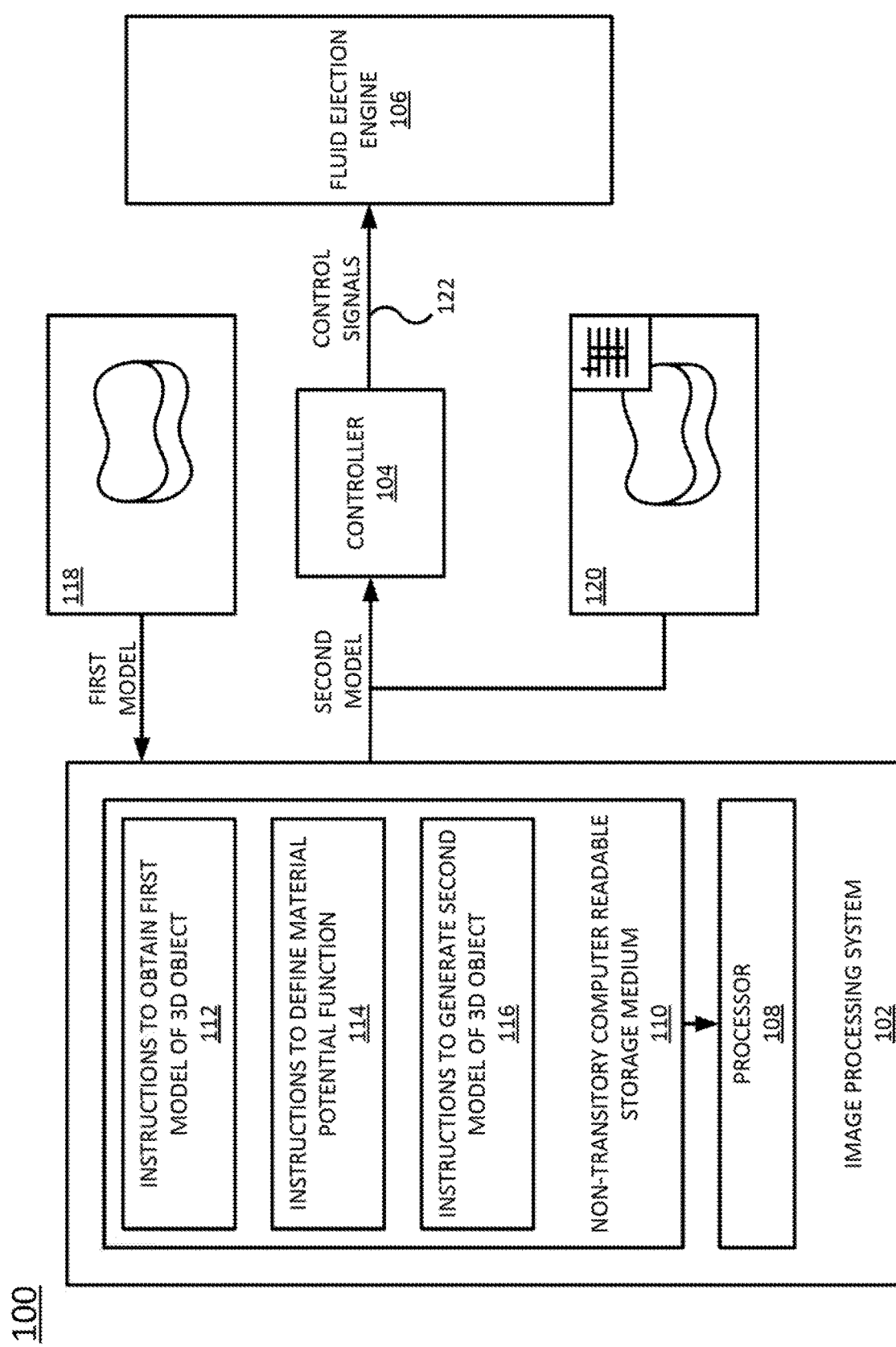
FIG. 1 illustrates a block diagram of a top view of an example fluid ejection system of the present disclosure.

The present disclosure broadly describes an apparatus, method, and non-transitory computer-readable medium for propagating a material through an interior volume of a three-dimensional (3D) object. As discussed above, additive manufacturing processes may be used to fabricate a variety of objects, including heterogeneous 3D objects. A heterogeneous 3D object has an interior volume that is composed of two or more different materials (where a void constitutes a distinct material). Such composition may be used to meet certain design objectives. For instance, by spatially arranging different materials and empty spaces, it may be possible to obtain a heterogeneous structure having mechanical properties that go beyond the mechanical properties of the constituent materials.

It is challenging, from a visual modelling perspective, to define which areas of a 3D object's volume will actually be composed of a specific material and/or exhibit a specific internal structure. In particular, it is challenging to accurately propagate even a single material inside an object volume in a 3D unit-based representation, if the material's property variation in specific regions inside the object is considered. Designer intents regarding material propagation are often expressed at the macro-level, and there is a gap between translating the macro-level intent into 3D unit-level models that can be used to drive object fabrication. When considering 3D objects composed of multiple different materials, where each material may have different properties (e.g., strength, thermal resistance, variation, color, elasticity, etc.), this challenge becomes even greater.

Examples of the present disclosure define a material potential function to illustrate the propagation of materials through a heterogeneous 3D object, including through the interior volume of the object. In one example, a first 3D digital model of the object is obtained, e.g., in any valid industry standard format. Next, the material potential function is defined for the materials and/or properties of the object. The material potential function is a function of three parameters: (1) the 3D point of original of the material or property in the object (i.e., where propagation of the material or property starts in the object); (2) the 3D space propagation limits of the material or property in the object (i.e., the boundaries of the material or property in the object); and (3) the 3D space propagation function of the material or property in the object (i.e., a mathematical equation that drives propagation of the material or property in the 3D space). Second and third 3D digital models of the object are then generated based on the material potential function and the first 3D digital model. The second 3D digital model is a part model from which the object can be manufactured via an additive manufacturing process, and it describes the propagations of the plurality of materials and/or properties through the object at the 3D unit (e.g., volumetric pixel or "voxel") level. The third 3D digital model is a 3D part model that can be used to preview material propagation inside the object's volume.

Within the context of the present disclosure, the term "heterogeneous," when used to refer to an object to be fabricated via an additive manufacturing process (or to the object's 3D model in digital form), is meant to indicate that the object is composed of two or more different materials, where a void constitutes a distinct material (thus, a heterogeneous object could also comprise an object that is composed of a single material having voids).

FIG. 1 illustrates a block diagram of a top view of an example fluid ejection system 100 of the present disclosure. The fluid ejection system 100 may comprise an additive manufacturing system, such as an additive manufacturing system using inkjet technology. In one example, the system 100 generally comprises an image processing system 102, a controller 104, and a fluid ejection engine 106. The image processing system 102, controller 104, and fluid ejection engine 106 work together to fabricate a heterogeneous 3D object via selective addition of a material, such as a fusing agent The image processing system 102 may comprise a computing device including a processor 108 and a non-transitory computer readable storage medium 110 that cooperate to generate a model from which the fluid ejection engine 106 can fabricate a 3D object. The non-transitory computer readable storage medium 110 may include instructions 114, 114, and 116 that when executed by the processor 108, cause the processor 108 to perform various functions.

In one example, the instructions may include instructions 112 to obtain a first 3D model 118 of an object composed of a plurality of different materials, i.e., a heterogeneous 3D object. As described in further detail below, in one example, the first 3D model may comprise a 3D model for an object that is written in any valid industry standard format (e.g., stereolithography or "STL" format, an OBJ format, a 3D manufacturing or "3MF" format, or the like).

The instructions 114 may include instructions to define a material potential function for a first material of the plurality of different materials. As described in further detail below, in one example, the material potential function is a function of a 3D point of origin of the first material in the object, a 3D propagation limit of the first material in the object, and a 3D propagation function of the first material in the object.

The instructions 116 may include instructions to generate a second 3D model of the object based in part on the material potential function and on the first 3D model. As described in further detail below, in one example, the second 3D model illustrates a propagation of the first material through an interior volume of the object at a 3D unit (e.g., volumetric pixel or "voxel") level. The second 3D model may comprise a plurality of cross sections or slice images that are reproduced by the fluid ejection engine 106 in printing fluid, where each slice image corresponds to one or more of the layers of the heterogeneous 3D object.

The controller 104 may comprise a computing device that is configured to generate a set of electronic control signals 122 based on the second 3D model 120. The set of control signals drives various components of the fluid ejection engine 106 to cooperate to fabricate the heterogeneous 3D object.

The fluid ejection engine 106 comprises a plurality of components that are configured to cooperate to fabricate the heterogeneous 3D object. For instance, in one example, the fluid ejection engine 106 may comprise a build bed, a movable fluid ejection array, a moveable curing array, and/or other components.

Figure 2:
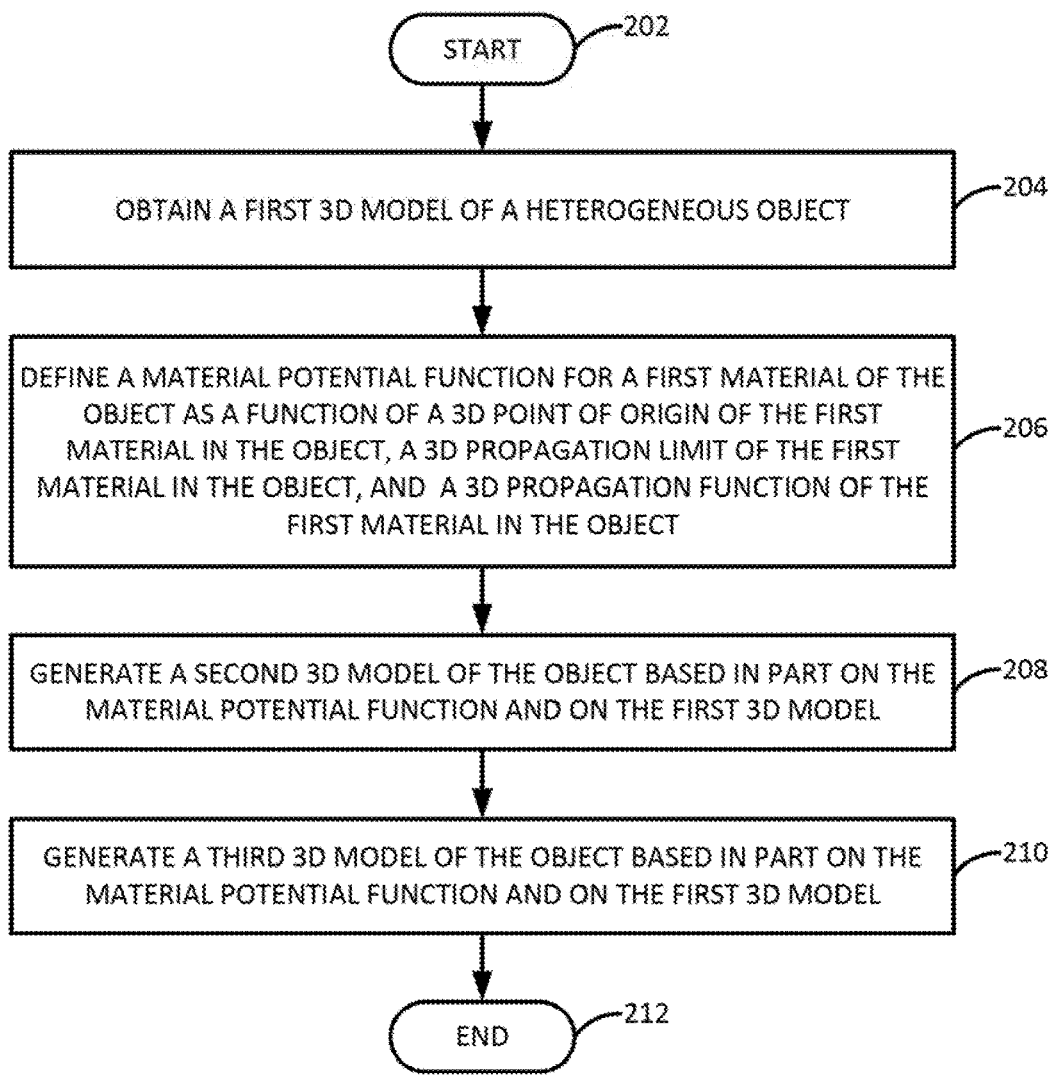
FIG. 2 illustrates a flowchart of an example method for propagating a material through an interior volume of a three-dimensional object.

FIG. 2 illustrates a flowchart of an example method 200 for propagating a material through an interior volume of a three-dimensional (3D) object. The method 200 may be performed, for example, by the system 100 illustrated in FIG. 1, and more particularly by the image processing system 102 of FIG. 1. As such, reference is made in the discussion of FIG. 2 to various components of the system 100 to facilitate understanding. However, the method 200 is not limited to implementation with the system illustrated in FIG. 1.

The method 200 begins in block 202. In block 204, a first 3D model of a heterogeneous object (e.g., a 3D object composed of a plurality of different materials or properties) is obtained. In one example, the first 3D model may comprise a 3D model for an object that is written in any valid industry standard format (e.g., STL format, OBJ format, 3MF format, or the like).

In block 206, a material potential function for a first material (or property) is defined. In one example, the material potential function is a function of a 3D point of origin of the first material (or property) in the object, a 3D propagation limit of the first material (or property) in the object, and a 3D propagation function of the first material (or property) in the object.

In one example, the 3D point of origin may be represented by the 3D coordinates of the point in 3D space from where the propagation of the first material (or property) will start. For instance, the 3D coordinates may be expressed as a point in a Cartesian coordinate space (e.g., XYX), as a line segment, as a plane, or as another type of geometric primitive.

In one example, the 3D propagation limit defines where the propagation of the first material (or property) ends in the 3D space. For instance, the 3D propagation limit may be defined as a bounding box, a minimal distance, a maximum distance, or an operation.

In the case of a bounding box, the 3D propagation limit may be represented as the coordinates in 3D space at which the propagation of the first material (or property) will stop (e.g., such that a bounding box is defined between the 3D point of origin and the coordinates at which the propagation stops). In the case of a minimal distance, the 3D propagation limit may be represented as the minimum distance to start propagation of the first material (or property) from the 3D point of origin. In the case of a maximum distance, the 3D propagation limit may be represented as the maximum distance to which to propagate the first material (or property) from the 3D point of origin. In the case of an operation, the 3D propagation limit may be represented as an operation to be executed with the propagation result (e.g., like a convolution or a metamorphosis operation).

In one example, the 3D propagation function is mathematical relation that drives propagation of the first material (or property) in the 3D space, from the 3D point of origin to the 3D propagation limit. In one example, the 3D propagation function is a distance function. For instance, the 3D propagation function might compute the Euclidean distance from the center of every 3D unit (e.g., voxel), in the 3D space bounded by the parameters of the 3D point of origin and the 3D propagation limit, to a point, line segment, or plane.

Figure 3C:
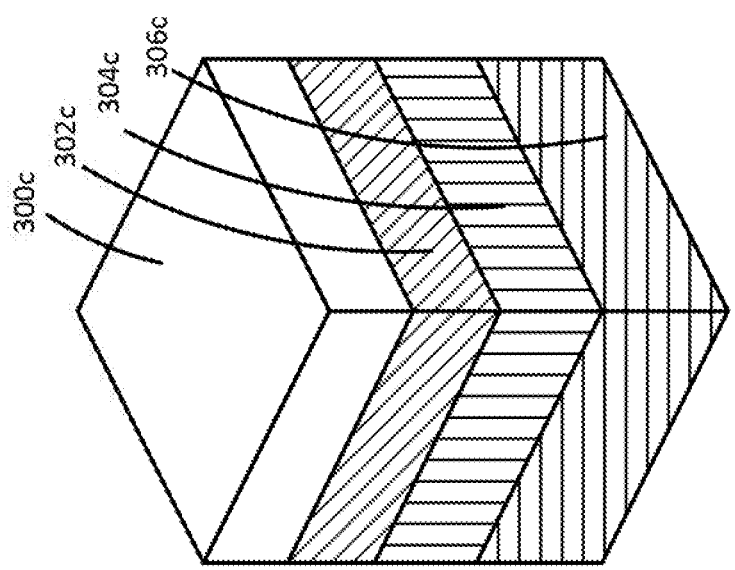
FIGS. 3A-3C illustrate example two-dimensional representations of a three-dimensional propagation function that is implemented as a distance function for a point, a line segment, and a plane, respectively.
Figure 3B:
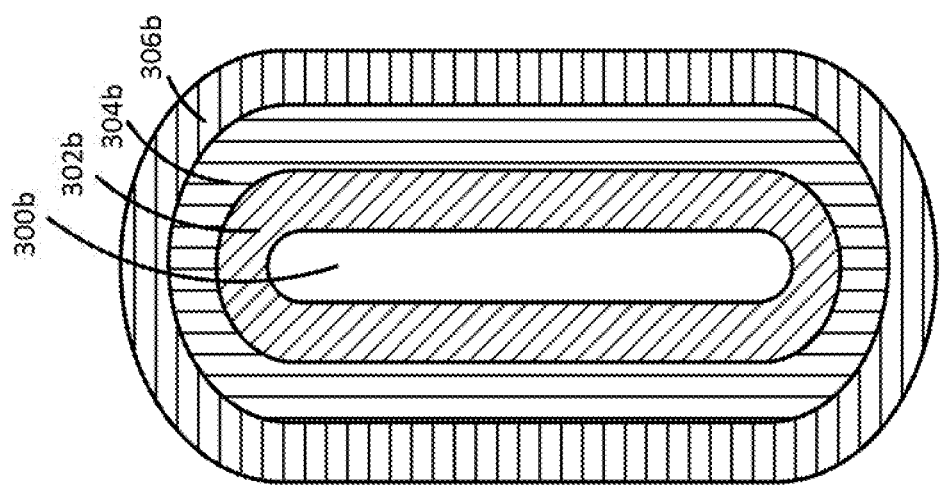
Figure 3A:
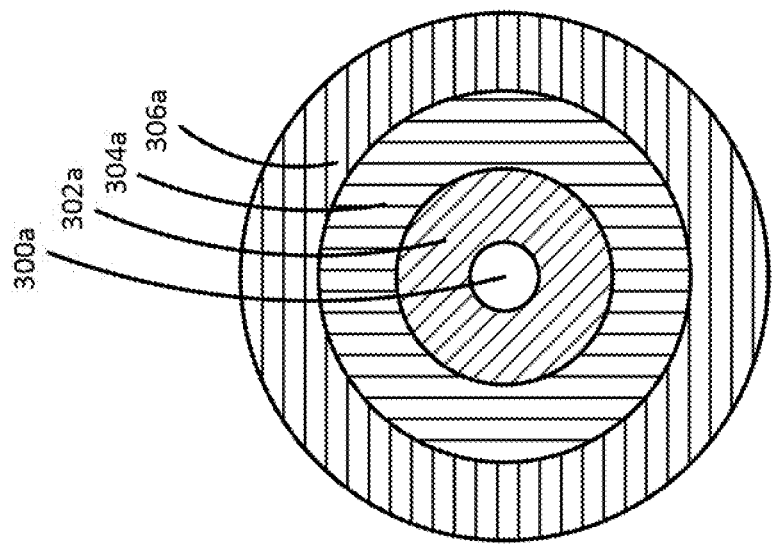

FIGS. 3A-3C, for instance, illustrate example two-dimensional (2D) representations of a three-dimensional propagation function that is implemented as a distance function for a point 300a, a line segment 300b, and a plane 300c, respectively. The various layers 302a-306a, 302-306b, and 302c-306c of the respective representations represent the distance values, with the innermost layers 302a, 302b, and 302c being located the smallest distances from the respective 3D points of origin. The distances gradually increase moving away from the 3D points of origin to largest distances 306a, 306b, or 306c.

Figure 4:
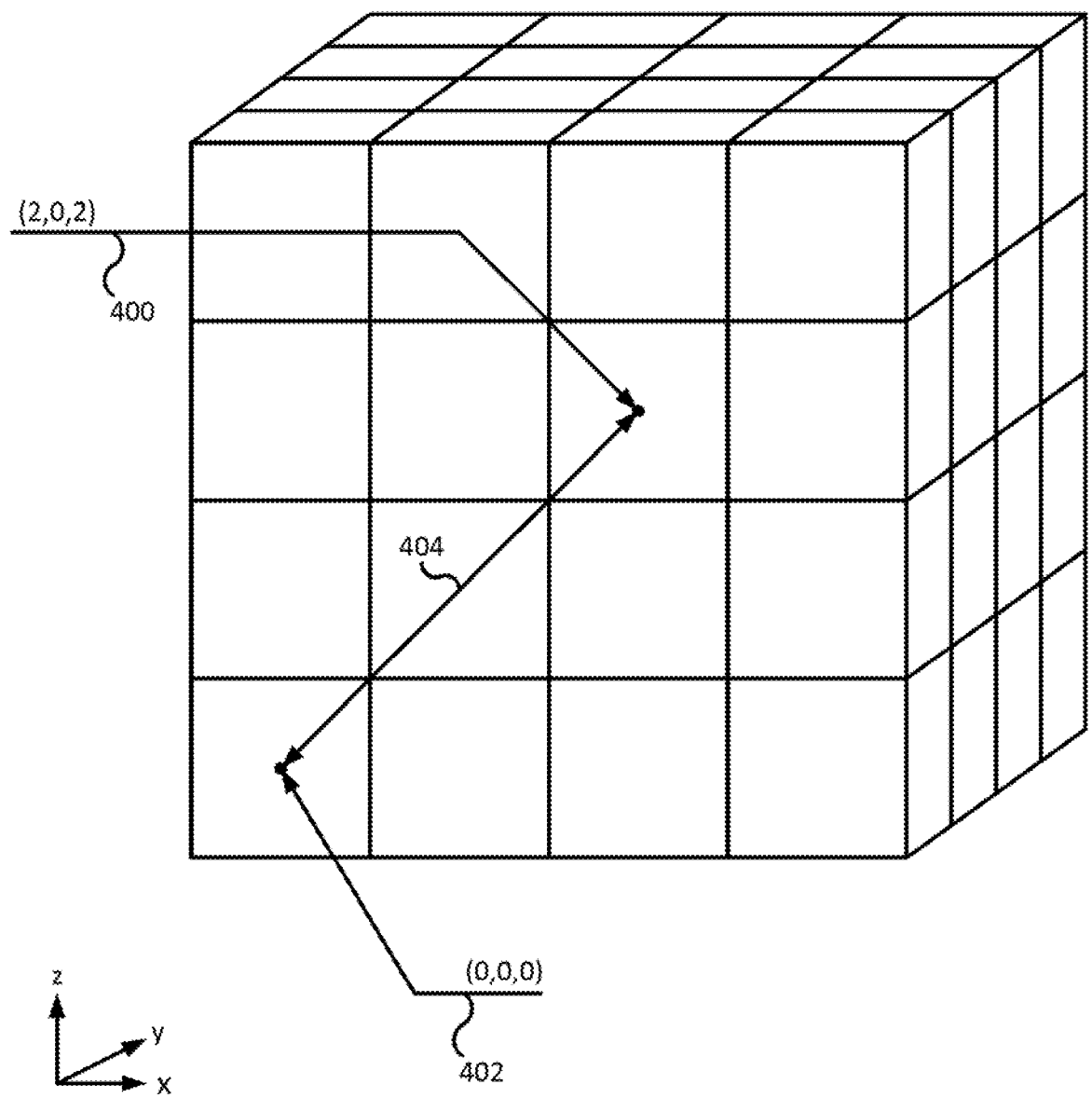
FIG. 4 illustrates an example showing how a point-type geometric primitive and a Euclidean distance function would be used to define the material potential function of an example three-dimensional unit based representation.

FIG. 4 illustrates an example showing how a point-type geometric primitive and a Euclidean distance function would be used to define the material potential function of an example three-dimensional unit based representation.

In the example of FIG. 4, the 3D unit-based representation is a voxel, i.e., voxel 400. The voxel 400 is represented by a point with the Cartesian coordinates of (2, 0, 2). In this example distance functions can be used to compute the orthogonal, mathematically defined, Euclidean distance from a point that belongs to one geometric primitive (e.g., point, line segment, plane, etc.) to every voxel's center along the way from the origin 402 (represented by a point with the Cartesian coordinates (0,0,0) in FIG. 4) to the propagation limits. The Euclidean distance function 404 in this case may be defined as:

$$d = f(x,y,x) = \sqrt{(x_{voxel}^2 - x_{point}^2) + (y_{voxel}^2 - y_{point}^2) + (z_{voxel}^2 - z_{point}^2)} \quad \text{(EQN. 1)}$$

Where d is the Euclidean distance function.

The example of FIG. 4 illustrates a simple material propagation function with a linear distribution. However, the example can be customized by another mathematical function, where the Euclidean distance function 404 is a 3D space propagation function attached to the material potential function.

Referring back to FIG. 2, in block 208, a second 3D model of the object is generated, based in part on the material potential function and on the first three-dimensional model. The second three-dimensional model illustrates the propagation of the first material through an interior volume of the object at the three-dimensional unit (e.g., voxel) level. That is, the second three-dimensional object shows the unit-by-unit (e.g., voxel-by-voxel) propagation of the first material. In one example, the second 3D model of the object comprises a high resolution, 3D printable model. In a further example, the second 3D model of the object may be generated in a format that can be used by an additive manufacturing system for fabricating the object.

In one example, generation of the second 3D model involves interpreting the material potential function to show how the first material (or property) will be propagated inside the interior volume of the object. In one example, the material potential function can be interpreted using an algorithm that is built on top of function representation (F-Rep) mathematical theory, where F-Rep defines a geometric object by a single real continuous function of point coordinates as $F(X) \geq 0$. Some libraries (e.g., the HyperFun library) provide basic software application programming interfaces and software development kits that can be used to build additional software layers (e.g., implementing material propagation functions).

In one example, the second 3D model of the object comprises a list of coordinates of 3D unit representations (e.g., voxels), where each 3D unit representation is associated with a payload of the material potential function (e.g., a set of properties for the 3D unit representation). The list of coordinates could be stored in a variety of formats, including plain text, JavaScript Object Notation (JSON), XML, and binary formats (e.g., in the case of a point cloud, or 3MF or simple voxels (SVX) formats (e.g., in the case of an octtree). 3MF and SVX can be used to represent the list of coordinates in a printable form, for instance.

In one example, the method 200 may additionally include a block 210 in which a third 3D model of the object is generated. In one example, the third 3D model of the object comprises a low resolution (e.g., relative to the second 3D model) model that can be used, for example, for previewing propagation of the first material (or property) through the object. The third 3D model may be generated in any of the formats in which the second 3D model may be generated.

The method 200 ends in step 214.

It should be noted that although not explicitly specified, some of the blocks, functions, or operations of the method 200 described above may include storing, displaying and/or outputting for a particular application. In other words, any data, records, fields, and/or intermediate results discussed in the method can be stored, displayed, and/or outputted to another device depending on the particular application. Furthermore, blocks, functions, or operations in FIG. 2 that recite a determining operation, or involve a decision, do not necessarily imply that both branches of the determining operation are practiced.

Figure 5:
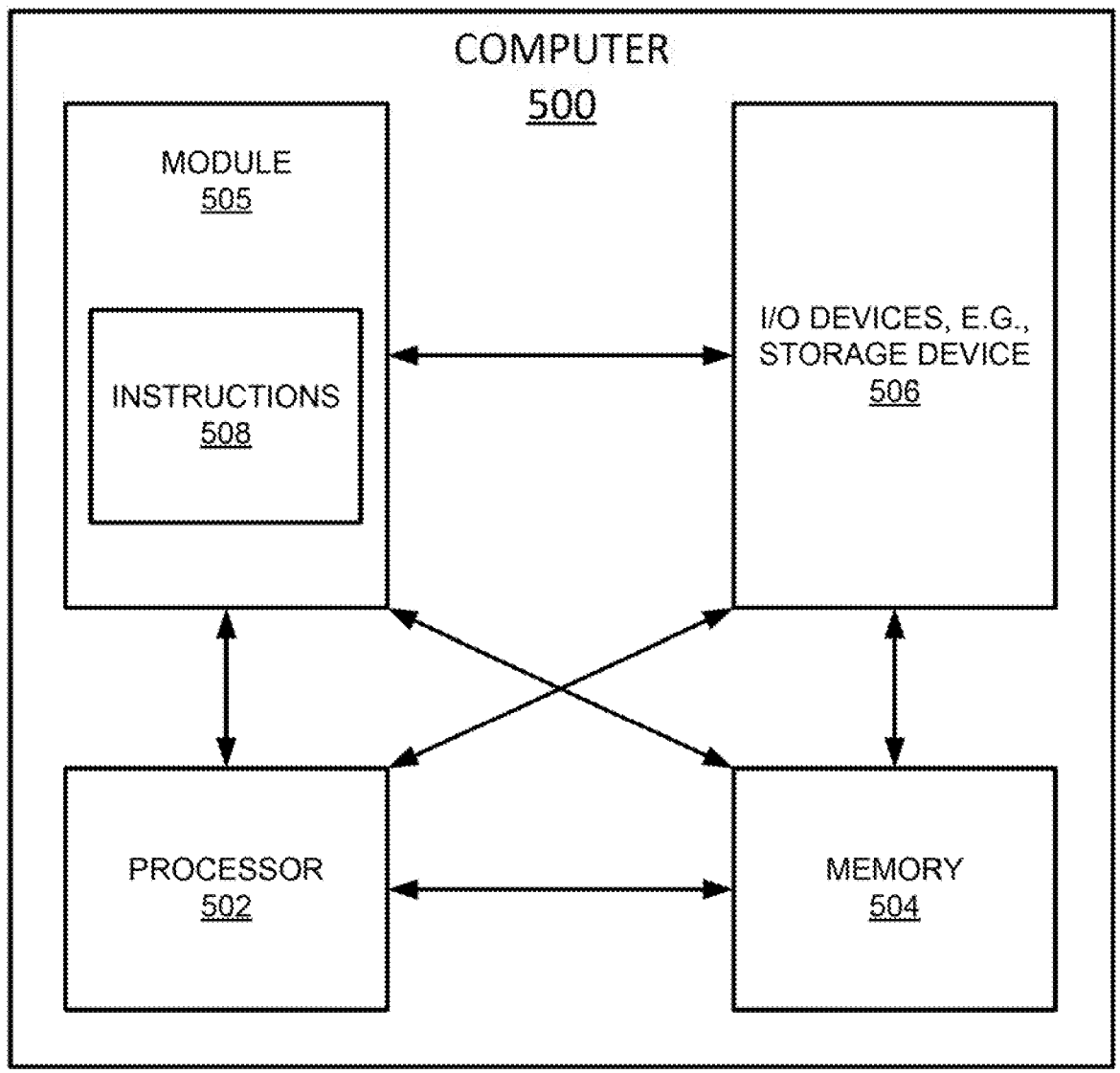
FIG. 5 depicts a high-level block diagram of an example computer that can be transformed into a machine capable of performing the functions described herein.

FIG. 5 depicts a high-level block diagram of an example computer that can be transformed into a machine capable of performing the functions described herein. Notably, no computer or machine currently exists that performs the functions as described herein. As a result, the examples of the present disclosure modify the operation and functioning of the general-purpose computer to propagate a material through an interior volume of a 3D object, as disclosed herein. In one example, the image processing system 102 of FIG. 1 may be implemented as the computer 500.

As depicted in FIG. 5, the computer 500 comprises a hardware processor element 502, e.g., a central processing unit (CPU), a microprocessor, or a multi-core processor, a memory 504, e.g., random access memory (RAM) and/or read only memory (ROM), a module 505 for propagating a material through an interior volume of a 3D object, and various input/output devices 506, e.g., storage devices, including but not limited to, a tape drive, a floppy drive, a hard disk drive or a compact disk drive, a receiver, a transmitter, a speaker, a display, an output port, an input port and a user input device, such as a keyboard, a keypad, a mouse, and the like. Although one processor element is shown, it should be noted that the general-purpose computer may employ a plurality of processor elements. Furthermore, although one general-purpose computer is shown in the figure, if the method(s) as discussed above is implemented in a distributed or parallel manner for a particular illustrative example, i.e., the blocks of the above method(s) or the entire method(s) are implemented across multiple or parallel general-purpose computers, then the general-purpose computer of this figure is intended to represent each of those multiple general-purpose computers. Furthermore, a hardware processor can be utilized in supporting a virtualized or shared computing environment. The virtualized computing environment may support a virtual machine representing computers, servers, or other computing devices. In such virtualized virtual machines, hardware components such as hardware processors and computer-readable storage devices may be virtualized or logically represented.

It should be noted that the present disclosure can be implemented by machine readable instructions and/or in a combination of machine readable instructions and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the blocks, functions and/or operations of the above disclosed method(s).

In one example, instructions and data for the present module or process 505 for propagating a material through an interior volume of a 3D object, e.g., machine readable instructions 508 can be loaded into memory 504 and executed by hardware processor element 502 to implement the blocks, functions or operations as discussed above in connection with the method 200. For instance, the machine readable instructions 508 may include a plurality of programming code components, such as programming code components for implementing the instructions 112, 114, and 116 of FIG. 1.

Furthermore, when a hardware processor executes instructions to perform "operations", this could include the hardware processor performing the operations directly and/or facilitating, directing, or cooperating with another hardware device or component, e.g., a co-processor and the like, to perform the operations.

The processor executing the machine readable instructions relating to the above described method(s) can be perceived as a programmed processor or a specialized processor. As such, the present module 505 for propagating a material through an interior volume of a 3D object, including associated data structures, of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, or variations therein may be subsequently made which are also intended to be encompassed by the following claims.

What is claimed is:

1. An apparatus, comprising:
an image processing system to acquire a first three-dimensional model of an object composed of a plurality of different materials, wherein the image processing system comprises:
a processor; and
a non-transitory machine-readable storage medium encoded with instructions executable by a processor, the machine-readable storage medium comprising:
instructions to define a material potential function for a first material of the plurality of different materials, wherein the material potential function is a function of a three-dimensional point of origin of the first material in the object, a three-dimensional propagation limit of the first material in the object, and a three-dimensional propagation function of the first material in the object;
instructions to generate a second three-dimensional model of the object based in part on the material potential function and on the first three-dimensional model of the object, wherein the second three-dimensional model illustrates a propagation of the first material through an interior volume of the object at a three-dimensional unit level, wherein the first three-dimensional model and the second three-dimensional model comprise models of the same object but are created in different model formats;
a controller to generate a set of control signals based on the second three-dimensional model of the object; and
a fluid ejection engine to perform the additive manufacturing process based on the set of control signals.

2. The apparatus of claim 1, wherein the second three-dimensional model is stored in a format usable by the fluid ejection engine to fabricate the object.

3. The apparatus of claim 2, wherein the second three-dimensional model comprises a list of coordinates of a plurality of three-dimensional unit representations of the object.

4. The apparatus of claim 3, wherein each three-dimensional unit representation of the plurality of three-dimensional unit representations is associated with a payload of the material potential function.

5. The apparatus of claim 4, wherein the payload comprises a set of properties for the each three-dimensional unit representation.

6. The apparatus of claim 1, wherein the machine-readable storage medium further comprises:
instructions to generate a third three-dimensional model of the object based on in part on the material potential function and on a first three-dimensional model of the object, wherein the first three-dimensional model, the second three-dimensional model, and the third three-dimensional model comprise models of the same object but are created in different model formats.

7. The apparatus of claim 6, wherein the third three-dimensional model of the object is stored in a format that allows previewing of the propagation of the first material through the interior volume of the object.

8. The apparatus of claim 7, wherein the third three-dimensional model is of a lower resolution than the second three-dimensional model.

9. A non-transitory machine-readable storage medium encoded with instructions executable by a processor, the machine-readable storage medium comprising:
instructions to obtain a first three-dimensional model of an object composed of a plurality of different materials;
instructions to define a material potential function for a first material of the plurality of different materials, wherein the material potential function is a function of a three-dimensional point of origin of the first material in the object, a three-dimensional propagation limit of the first material in the object, and a three-dimensional propagation function of the first material in the object;
instructions to generate a second three-dimensional model of the object based in part on the material potential function and on the first three-dimensional model, wherein the second three-dimensional model illustrates a propagation of the first material through an interior volume of the object at a three-dimensional unit level, wherein the first three-dimensional model and the second three-dimensional model comprise models of the same object but are created in different model formats.

10. The non-transitory machine-readable storage medium of claim 9, wherein the instructions further comprise:
instructions to generate a third three-dimensional model of the object based on in part on the material potential function and on a first three-dimensional model of the object, wherein the third three-dimensional model is of a lower resolution than the second three-dimensional model, wherein the first three-dimensional model, the second three-dimensional model, and the third three-dimensional model comprise models of the same object but created in model different formats.

11. The non-transitory machine-readable storage medium of claim 10, wherein the three-dimensional propagation function is a distance function.

12. The non-transitory machine-readable storage medium of claim 11, wherein the three-dimensional propagation function computes a Euclidean distance from a center of every three-dimensional unit representation of the object, in a three-dimensional space bounded by parameters of the three-dimensional point of origin and the three-dimensional propagation limit, to a point, line segment, or plane in the object.

13. The non-transitory machine-readable storage medium of claim 9, wherein the instructions to define the material potential function and the instructions to generate the second three-dimensional model of the object are repeated for each material of the plurality of different materials.

14. A method, comprising:
obtaining a first three-dimensional model of an object composed of a plurality of different materials;
defining a material potential function for a first material of the plurality of different materials, wherein the material potential function is a function of a three-dimensional point of origin of the first material in the object, a three-dimensional propagation limit of the first material in the object, and a three-dimensional propagation function of the first material in the object;
generating a second three-dimensional model of the object based in part on the material potential function and on the first three-dimensional model, wherein the second three-dimensional model illustrates a propagation of the first material through an interior volume of the object at a three-dimensional unit level, wherein the first three-dimensional model and the second three-dimensional model comprise models of the same object but created in different model formats.

15. The method of claim 14, further comprising:
generating a third three-dimensional model of the object based on in part on the material potential function and on a first three-dimensional model of the object, wherein the third three-dimensional model is of a lower resolution than the second three-dimensional model, wherein the first three-dimensional model, the second three-dimensional model, and the third three-dimensional model comprise models of the same object but created in different model formats.

16. The apparatus of claim 6, wherein the three-dimensional propagation function is a distance function.

17. The apparatus of claim 16, wherein the three-dimensional propagation function computes a Euclidean distance from a center of every three-dimensional unit representation of the object, in a three-dimensional space bounded by parameters of the three-dimensional point of origin and the three-dimensional propagation limit, to a point, line segment, or plane in the object.

18. The apparatus of claim 1, wherein the instructions to define the material potential function and the instructions to generate the second three-dimensional model of the object are repeated for each material of the plurality of different materials.

19. The apparatus of claim 1, wherein the first three-dimensional model is written in one of: STL model format, OBJ model format, or 3MF model format.

20. The apparatus of claim 19, wherein the second three-dimensional model is written in a model format that can be used by the fluid ejection engine for fabricating the object, the second three-dimensional model comprises a part model.

* * * * *

UNITED STATES PATENT AND TRADEMARK OFFICE
CERTIFICATE OF CORRECTION

| | | |
|---|---|---|
| PATENT NO. | : 11,565,473 B2 | |
| APPLICATION NO. | : 16/615612 | |
| DATED | : January 31, 2023 | |
| INVENTOR(S) | : Marcelo Riss et al. | |

It is certified that error appears in the above-identified patent and that said Letters Patent is hereby corrected as shown below:

On the Title Page

In the Assignee Information, Item (73): Please remove "HEWLETT-PACKARD DEVELOPMENT COMPANY, L.P., Spring, TX (US)" and insert --INSTITUTO ATLÂNTICO, Edson Queiroz, Fortaleza (BR); HEWLETT-PACKARD DEVELOPMENT COMPANY, L.P., Spring, TX (US)--.

Signed and Sealed this
Fourteenth Day of March, 2023

Katherine Kelly Vidal
*Director of the United States Patent and Trademark Office*